United States Patent [19]

Morinaga et al.

[11] Patent Number: 4,956,038

[45] Date of Patent: Sep. 11, 1990

[54] METHOD FOR LINING PIPE LINES

[75] Inventors: Akio Morinaga, Fujisawa; Masakatsu Hyodo, Takatsuki; Tomiya Nishimoto, Mishima; Hiroyuki Sakuragi, Kobe; Shinji Onishi, Takarazuka, all of Japan

[73] Assignees: Tokyo Gas Kabushiki Kaisha, Tokyo; Ashimori Kogyo Kabushiki Kaisha, Osaka, both of Japan

[21] Appl. No.: 368,908

[22] Filed: Jun. 19, 1989

Related U.S. Application Data

[63] Continuation of Ser. No. 110,706, filed as PCT JP87/00087 on Feb. 12, 1987, published as WO87/04975 on Aug. 27, 1987, abandoned.

[30] Foreign Application Priority Data

Feb. 12, 1986 [JP] Japan .................................. 61-28158
Feb. 12, 1986 [JP] Japan .................................. 61-28159
Feb. 12, 1986 [JP] Japan .................................. 61-28160

[51] Int. Cl.$^5$ ..................... B29C 63/36; B29C 65/54
[52] U.S. Cl. ............................ 156/156; 156/287; 156/294; 156/330; 264/269; 264/270; 427/230
[58] Field of Search ............... 156/155–156, 156/244.13, 285, 287, 289, 293, 294, 303.1, 244.14; 264/267–270, 566, 571, 250, 259, 261–263, 500, 512, 575, 563, 339, 285; 138/143, 141, 97, 149, D6; 285/55, 45; 427/230, 236

[56] References Cited

U.S. PATENT DOCUMENTS

| | | | |
|---|---|---|---|
| 3,381,718 | 5/1988 | Darrow | 156/287 |
| 4,009,063 | 2/1977 | Wood | 156/294 |
| 4,064,211 | 12/1977 | Wood | 156/287 |
| 4,334,943 | 6/1982 | Zenbayashi | 156/287 |
| 4,368,091 | 1/1983 | Ontsuga | 156/287 |

FOREIGN PATENT DOCUMENTS

| | | |
|---|---|---|
| 41263 | 3/1980 | Japan . |
| 101012 | 6/1983 | Japan . |
| 78672 | 5/1985 | Japan . |

*Primary Examiner*—Merrell C. Cashion, Jr.
*Attorney, Agent, or Firm*—Birch, Stewart, Kolasch & Birch

[57] ABSTRACT

A method for lining pipe lines for transporting city water, city gas, petroleum and other various kinds of fluids.

In a method used as a conventional art, i.e. a method for lining pipe lines which comprises pushing forward a flexible tubular lining material (2) provided on the inner surface thereof with a binder to allow a turning portion (4) of the lining material (2) to advance within a pipe line (1) while turning the lining material (2) inside out under fluid pressure thereby bonding the evaginated lining material onto the inner surface of the pipe line (1), the present invention is characterized in that a portion of the pipe line in the forwardly moving direction of the turning portion (4) is fully filled with water (7) and that a binder of the reaction-curing type, capable of reacting with water to initiate curing, is used as the binder, whereby the binder on the inner surface of the lining material is brought into contact with the water and cured at the turning portion (4) to bond the outer surface of the evaginated lining material onto which the binder has been applied to the inner surface of the pipe line (1).

2 Claims, 3 Drawing Sheets

METHOD FOR LINING PIPE LINES

This application is a continuation, of application Ser. No. 110,706 filed as PCT JP87/00087 on Feb. 12, 1987 published as WO87/04975 on Aug. 27, 1987.

BACKGROUND OF THE INVENTION

1. Field of the Invention

The present invention relates to a method for lining pipe lines used for transporting city water, city gas, petroleum and other various kinds of fluids for the purpose of repair or reinforcement of these pipe lines, and more particularly, to a method for lining pipe lines, especially underwater pipe lines, such as those laid on the bottom of a sea; lake or river, wherein a flexible lining material is applied onto the inner surface of such pipe lines.

2. Discussion of Prior Art

From the past, a variety of methods have been proposed as a means for lining pipe lines. In U.S. Pat. No. 3,381,718, for example, there is disclosed a method for lining concrete pipe lines, especially those for sewers through which a corrosive liquid is passed, wherein an acid- and alkali-resistant plastic sheet is applied onto the inner surface of the concrete pipe lines. This plastic sheet is a laminate comprised of a fabric of a fibrous material, such as cotton, synthetic fibers or glass wool, overlaid with a vinyl chloride resin according to a calendering, coating or the like means, and is shaped in a tubular form by the aid of a special cylinder. In this U.S. patent wherein the plastic sheet is inserted into a concrete pipe line and then inflated for lining the pipe line, the method is troublesome in its operation per se and is not suited for lining long pipe lines. A binder used in this U.S. patent for bonding a tubular lining sheet to the pipe lines is an epoxy resin generally utilized in a dry state (See Col. 3, lines 7–13).

In U.S. Pat. No. 4,009,063, there is disclosed a method for lining a pipe line having manholes with a hard rigid pipe of thermosetting resin. The pipe for lining used in this patent is manufactured by immersing a tubular fibrous felt in a resin to form a pipe comprising an impervious film on the inner side thereof and a curable resinous layer on the outer side thereof. An inflatable tube is inserted into the pipe and the tube is inflated in a pipe line to attain its lining with the pipe being laid on the tube. This method is not suited as a method for lining pipe lines buried in the ground and cannot be used for lining long pipe lines, particularly those having bends. In this U.S. patent, a polyester resin and an ordinary epoxy resin are used as general curing resins (See Col. 10, lines 11–23).

There is also known a method for lining pipe lines which is carried out in such manner that a flexible lining material in the form of a tube previously provided on the inner surface thereof with a binder is inserted into a pipe line and allowed to advance therein while turning the lining material inside out under fluid pressure whereby the lining material is bonded onto the inner surface of the pipe line by the aid of the binder. According to this method, it is unnecessary to dig up a pipe line over its full length and the method is operable simply at both terminal ends of the pipe line. The lining work itself can be done even for a long pipe line and within a short period of time, thus being regarded as an excellent method in recent years (See U.S. Pat. Nos. 4,064,211, 4,368,091 and 4,334,943).

In the above mentioned U.S. Pat. No. 4,064,211, there is disclosed the so-called evagination-lining method wherein one end of a tubular lining material provided on the inner surface thereof with a binder is fastened and bonded in an evaginated state to one end of a pipe and a liquid is inserted from the other end of the pipe into the interior of the pipe whereby the tubular lining material is allowed to advance within the pipe line under fluid pressure while being turned inside out to attain the lining of the pipe line. After completion of the evagination-lining operation, a small tube is inserted into the lined pipe line and a warmed liquid is circulated to accelerate curing of the binder. In this method, the circulation operation of a warmed liquid after application of the lining material onto the inner surface of the pipe line is troublesome; a considerably large amount of the warmed liquid is required in case of lining a long pipe line, and so the operation for circulation and warmth-keeping of such a large amount of the warmed liquid is very troublesome. In particular, it is difficult to bond the lining material completely onto the inner surface of the pipe line when the pipe line is inclined or bent in a vertical direction. An epoxy resin is disclosed in this U.S. patent as the binder used therein (See Col. 3, lines 5–6).

The evagination-lining methods disclosed in the above-mentioned U.S. Pat. Nos. 4,368,091 and 4,334,943 enable control of the fluid pressure required for evagination of the lining material by the aid of a pressure container, and concurrently adjustment of the amount of a binder to be supplied onto the inner surface of the lining material. The method disclosed in the latter mentioned patent is especially excellent in that the lining operation can be carried out, without forming any wrinkles in the lining material and forming a narrow path in bend portions of the pipe line, by adjusting the speed of the lining material in its advancing movement within the pipe line by the aid of a special evagination-inducing belt drawn from the opposite side of the pipe line. Since the binder used in this method is an epoxy resin, however, there is a problem in using this method for lining of a pipe line having a length as long as several thousand meters in view of a limited pot life of the binder to be used.

In principle, the evagination-lining method just mentioned above is applicable to a pipe line irrespective of its length. Actually, however, the method is applicable to a pipe line having a length as long as several hundred meters but is hardly applicable directly to one having a length beyond that length.

In case the lining treatment is carried out according to this method, the pipe line is treated with a scraper or the like to remove rust, etc. thereon, washed with water and then dried prior to introduction of a tubular lining material under evagination.

As mentioned above, the pipe line and the lining material are bonded by the aid of a binder. As both the lining material and the pipe line are of air-impervious materials, however, a binder containing a volatile substance such as a binder of rubber type cannot be used. Among binders now conventionally employed, therefore, any binder other than those of the reaction-curing type can be used. The reactioncuring type binder is advantageous in that when it is cured in the state of being impregnated, in a large amount, into the lining material, the binder will form a rigid pipe inside the pipe line after curing, which pipe will maintain the function of a flow path to prevent leakage of a fluid even if bonding of the lining material is partially insufficient or the pipe line itself is broken by external force.

In the above mentioned evagination lining method wherein a binder is prepared and then applied onto the inner surface of a lining material and thereafter the lining material is introduced into the pipe line under evagination, it takes a longer time for such a series of steps and the binder must not be cured during the steps.

As the pipe line becomes longer, it proportionally takes a longer time for the application of the binder and for the introduction of the lining material into the pipe line. Consequently, the binder should proportionally have a sufficiently longer pot life. However, a binder having a longer pot life requires a longer time for its curing. Thus, a longer time is needed for a period from the insertion of the lining material to the completion of curing of the binder, and as a result, the time needed for the whole treatment becomes longer.

Under such circumstances, European Laid-open Pat. application No. 155,406 discloses the use of a precurable acrylic binder based on photopolymerization for curing the applied binder without using any warming medium. According to this method, the evagination-lining treatment is carried out using, as a binder, a curable resin containing a catalyst which can initiate polymerization by radiation by actinic light, and at the same time, irradiated light is introduced into the lining material to cause early curing. In this method, however, it is troublesome to introduce an irradiation light source to the lining material applied to a long pipe line. Further, a light having a specific wave length capable of exciting the catalyst is necessary in this method, thus making it practically unattractive.

In the conventional evagination-lining methods, the length of the pipe line in the working section is usually limited to about 2-300 meters for the various reasons above mentioned. It is the current status, therefore, that the lining treatment for a long pipe line system be accomplished by repeating the pipe-lining work for short section of the pipe line.

The present invention has been accomplished in view of the above situation, and its object resides in an improvement relating to conventional evagination-lining methods and in providing a method which can line a long pipe line having a length of several thousand meters or more in a simple operation.

SUMMARY OF THE INVENTION

The present invention provides a method for lining pipe lines which comprises pushing forward a flexible tubular lining material provided on the inner surface thereof with a binder to allow a turning portion thereof to advance within a pipe line while turning the lining material inside out under fluid pressure thereby bonding the evaginated lining material onto the inner surface of the pipe line, characterized in that an unlined portion of the pipe line in advance of the turning portion is fully filled with water and that a binder of a reaction-curing type capable of reacting with water to initiate curing is used as the binder, whereby the binder on the inner surface of the lining material is brought into contact with water and cured at the turning portion to bond the evaginated lining material onto which the binder has been applied to the inner surface of the pipe line.

BRIEF DESCRIPTION OF DRAWINGS

The present invention will be explained in detail with reference to the accompanying drawings wherein

FIG. 1 and FIG. 2 show the state of applying a lining to a pipe line 1 according to the method of the present invention. In FIG. 1 is shown the case wherein air is used as the fluid pressure in the interior space of the tubular lining material. 22, 22 shows the advance direction of evagination of the lining material under such pressure. In FIG. 2 is shown the case wherein water is used as the fluid pressure. 21, 22 shows the advance direction of evagination of the lining material under such pressure. In the drawings, a pipe line 1 has a tubular lining material 4, with a binder 3 applied onto the inner surface thereof, provided to the interior of the pipe, a turning portion 4 where the tubular lining material is turned inside out, and water 7 fully occupied in the pipe line in the forward direction from the turning portion 4. The inner surface of the pipe line 1 is previously cleaned with a scraper or the like to remove rust, etc. and then washed with water. The water used for washing the inner surface of the pipe line 1 is discharged from the pipe line 1.

Figure 1:
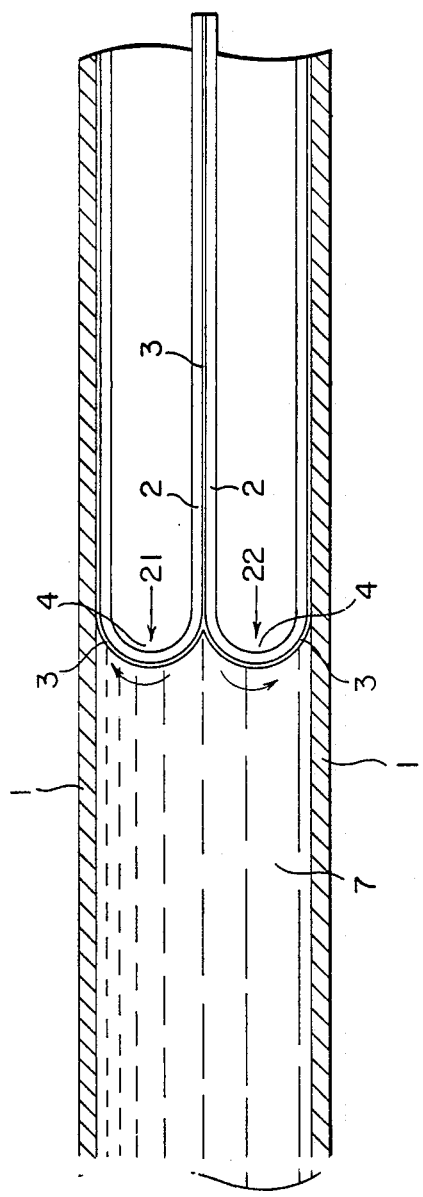
FIG. 1 and FIG. 2 are schematical longitudinal section views of a pipe line being lined according to the method of the present invention.

The lining material 2 is provided on the inner surface of the pipe line 1 with a binder 3. A reaction-curing type binder capable of reacting with water to initiate curing is used as the binder 3.

The binder 3 used in the present invention is, for example, two-component reaction-curing type binders of the epoxy series which becomes reactive only when brought into contact with water. Mentioned as an example is the use of a main epoxy ingredient and a ketimine or an aldoimine of a polyamine curing ingredient. Proper examples of the main epoxy ingredient include an epoxy resin of a liquid diglycidyl ether of bis-phenol type, an alicyclic epoxy resin, an epoxy resin of phenol or cresol novolac type, an epoxy resin of a glycidyl ester of phthalic acid type, an epoxy resin of $\beta$-methylepichlorohydrin type, an epoxy resin of a dimer acid type and an epoxy resin of a polyglycol type. Besides these, various kinds of commercially available epoxy resins are known. The ketimine or aldoimine of a polyamine used as the curing ingredient is prepared by a dehydrocondensation reaction between the primary or secondary amino group of the polyamine or polyamide and a carbonyl compound such as a ketone or aldehyde. Unlike the case of ordinary polyamine curing ingredients, this ketimine or aldoimine of a polyamine or polyamide is not reacted as such with the main epoxy ingredient even if both are mixed. Neither solvent nor diluent is necessary for this mixing. Accordingly, the ketimine or aldoimine of a polyamine or polyamide in a mixture with the main epoxy ingredient shows an extremely long pot life. When the ketimine or aldoimine of a polyamine or polyamide is brought into contact with water, however, it undergoes hydrolysis to form the polyamine or polyamide which will react at normal temperature as a curing ingredient with the main epoxy ingredient. In the method of this invention wherein the lining material is applied according to the evaginationlining method onto the inner surface of a pipe line, this reaction-curing type binder capable of reacting with water which has been applied onto the inner surface of a tubular lining material is brought into contact at the turning portion with water filled within the pipe line in advance of the lining material and is converted into a binder to bond the lining material to the pipe line. Various kinds of ketiminated polyamines are commercially available as the ketimine of a polyamine. For example, Epicure H-1, H-2, H-3, H-5, H-5S and H-6 (Shell), Araldite HY-831 and 833 (Ciba-Geigy), etc. can be used. A base amine of the ketiminated polyamine is an aliphatic amine or an aliphatic or aromatic amine. The use of a ketiminated polyamine having a long chain aliphatic amine containing an aromatic nucleus, such as Epicure H-5 or H-6 is preferable as the base amine since it affords a binder coat possessing excellent adhesion and flexibility.

Further, certain kinds of the modified silicone series and of the urethane series are known to be capable of reacting with water to initiate curing. The binder may suitably be selected from these.

In order to apply the binder 3 onto the inner surface of the lining material 2, the binder is injected into the interior space of the pipe line from one end, and the lining material is allowed to pass through nip rolls and wound on a reel while squeezing the binder. The tubular lining material 2 previously charged on the inner surface thereof with the binder 3 may once be wound on a reel and then taken off and introduced into the pipe line 1 on demand. Further, the lining material 2 may be provided with the binder 3 and continuously introduced as such into the pipe line 1 for carrying out the lining treatment.

On injection of the binder 3 into the tubular interior space of the pipe line, it is preferable that the interior space be previously kept under reduced pressure to expel the air. The lining material 2 is effectively impregnated with the binder 3 by this treatment so that the adhesion strength is enhanced, with additional merit that any moisture contained in the lining material 2 is eliminated to prevent any premature curing of the binder 3.

After the tubular lining material 2 has been provided on the inner surface thereof with the binder 3, the tubular lining material 2 is evaginated at its one end and the evaginated portion is bonded and fixed onto the inner surface at one end (31, 32) of a pipe line 1. When fluid pressure is applied to the rear (21, 22) of the fixed portion, the tubular lining material 2 is turned inside out to form a turning portion 4.

Figure 2:
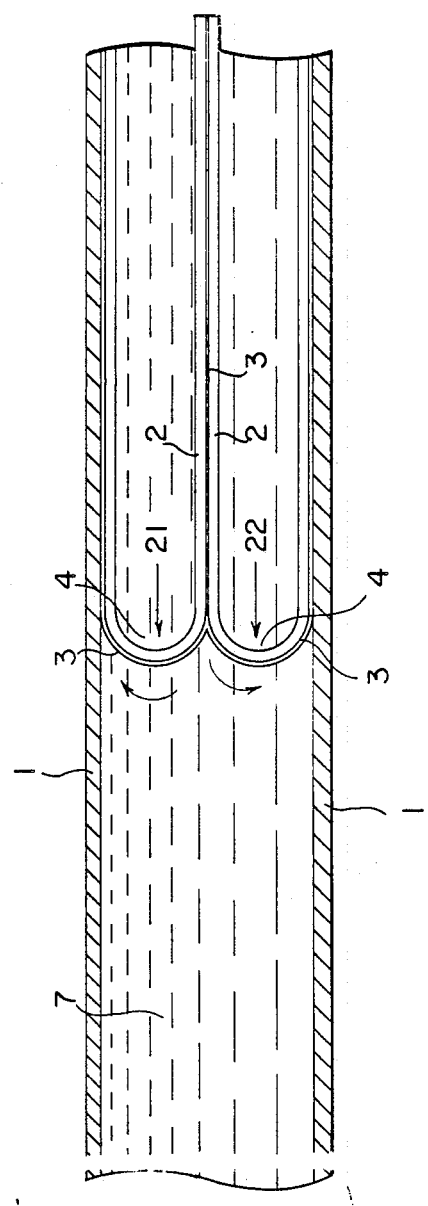

As shown in FIGS. 1 and 2, the lining material is continuously evaginated as in the turning portion 4 in such manner that the inside of the lining material 2 is turned outside. The turning portion 4 is allowed to move forward within the pipe line 1 and the lining material 2 evaginated in the turning portion 4 is pressed against the inner surface of the pipe line 1 with the binder 3 being interposed therebetween.

The binder 3 is not brought into contact with water while being on the inner surface of the lining material 2 and so is not reacted with water, thus failing to initiate curing. When the binder 3 reaches the turning portion 4 with the proceeding of the evagination of the lining material 2, the binder 3 is brought into contact with water and is then interposed between the inner surface of the pipe line and the evaginated lining material 2 whereby the binder 3 is cured by the reaction with water 7 to bond the lining material 2 to the pipe line 1 firmly.

When the lining material 2 is evaginated over its full length and the front end of the turning portion of the lining material 2 reaches the other end of the pipe line 1, introduction of the pressurizing fluid is stopped and the pipe line 1 is connected at both ends thereof to other pipe lines by a proper means, thereby finishing the operation.

The method of this invention for lining pipe lines is useful, especially as a method for lining underwater pipe lines, such as those laid on the bottom of a sea, lake or river.

Figure 3:
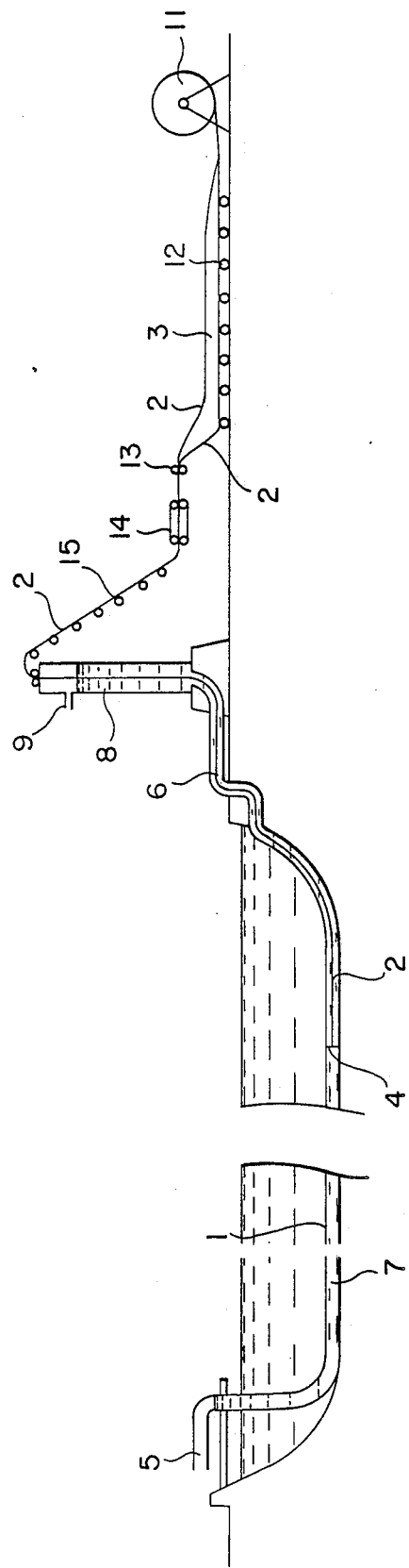
FIG. 3 is a schematic view showing an embodiment of the method of the present invention applied to a lining treatment for a pipe line laid at the bottom of water.

Examples of the pipe line laid on the bottom of water include transbay and transchannel pipe lines for transporting water or oil. FIG. 3 is a diagram showing an example of applying the method for such pipe lines. Referring to this drawing, an embodiment of this invention will be explained.

In case such a pipe line laid on the bottom of the sea for transporting an oil is corroded or superannuated, it is extremely difficult to replace such a pipe line wholly with a new one. Consequently, it is necessary to regenerate the function of the pipe line by lining it.

In case of a petroleum pipe line laid on the bottom of water, the pipe line is filled with petroleum during the transportation of petroleum. After the transportation, petroleum remaining in the pipe line is drawn out to fill it with air, and a great buoyant force will act on the pipe line. Thus, the pipe line is always filled with petroleum or with water by replacing the petroleum with water even in the case of when the pipe line not being used. It is impossible to draw out the remaining petroleum or water also in case of the pipe line being lined. If this petroleum or water is drawn out, a great buoyant force will act on the pipe line and cause floating of the whole pipe line in water when the pipe line is not fixed on the bottom of water. Even if the pipe line is fixed on the bottom of water, the buoyant force will cause breakage of the fixed portion to allow the pipe line to float, or give the pipe line unnecessary load to cause destruction in a weaker portion even in the event the pipe line is not allowed to float.

In general, the above mentioned conventional evagination-lining method is applied from the past to underground pipe lines such as gas conduits, city water pipe lines, sewage pipe line, etc. In such pipe lines, the length of the pipe line which can be lined in a single operation is at most several hundred meters. Since these pipe lines are provided with manholes at an interval of at least 2-300 m, the section of the pipe line between the manholes is satisfactorily subjected to lining. Even if the pipe line is devoid of manholes, the ground is dug up in appropriate positions to disconnect the pipe line in portions having a length as long as 2-300 m and the lining treatment for the pipe line is satisfactorily carried out portionwise. Hitherto, the lining treatment has not yet been applied to a longer pipe line having a length greater than that length.

In case of an underwater pipe line which is laid between the places so far distant from each other that it is difficult to construct a pipe line on the water level, however, the length of the pipe line is at least 1000 m in the majority of cases, and 3000-10,000 m in some cases. As the almost all of such pipe line is laid on the bottom of water, it is quite impossible to disconnect the pipe line in portions and to carry out the operation portionwise for short portions of the pipe line.

In principle, the above mentioned evagination-lining method is applicable to unlimitedly long pipe lines. Actually, however, the treatment of a binder becomes more difficult as the pipe line becomes longer. As the pipe line becomes longer and the operation requires a longer period of time, it is likely that a reaction-curing type binder usually employed as the binder causes premature curing. No problem will arise in case of using a binder having a sufficiently longer pot life, but the curing time becomes longer as the pot life becomes longer, and as the result, a considerable time is required for an overall lining treatment. In addition, it is impossible to circulate a hot medium for warming to accelerate the curing of the binder in case of underwater pipe lines surrounded with water.

According to the present invention, there is provided a method suitable for lining an extremely long pipe line laid on the bottom of water, such as the above mentioned undersea petroleum pipe lines, wherein the conventional evaginationlining method is improved.

In FIG. 3, a pipe line 1 is laid on the bottom of water, both ends of which 5, 6 are exposed on the land. In order to carry out the method of this invention, the undersea petroleum pipe line (pipe line 1) is disconnected at its both ends on the land, and any residual petroleum in the pipe line is replaced with water. The inner surface of the pipe line is cleaned by passing water through the pipe line. If necessary, it is preferable to clean the inner surface additionally by the aid of a pig, scraper or the like. The pipe line is finally filled with clarified water 7.

On the other hand, a water column 8 is constructed at one end of the pipe line on the land. A lower end of the water column 8 is connected to the one end of the pipe line 1. The height of the water column 8 is preferably 10–20 m at the top thereof from the sea level. A water inlet 9 is provided at the upper end of the water column 8. The other end 5 of the undersea petroleum pipe line (pipe line 1) remains opened.

In the drawing, 2 shown as a single line is a flexible tubular lining material and is wound on a reel 11 in the form of a coil. Although any of the materials employed hitherto for known conventional lining materials can be used, the lining material 2 having such structure that a tubular fabric wherein fibers have been knitted in a tubular form is provided on the exterior surface thereof with a film of a flexible synthetic resin is preferable. In case of a lining material for lining undersea petroleum pipe lines, the use of a polyester elastic resin is preferably used as the synthetic resin as having oil-resisting property.

The lining material 2 is reeled off and the binder 3 is introduced into the interior space of the tubular lining material 2 from its front end. As described above, the binder 3 used in the method of this invention is a reactioncuring type one capable of reacting with water to initiate curing.

It is preferable to evacuate the tubular lining material 2 from its both ends to remove the air in the lining material 2 prior to introduction of the binder 3 into the tubular lining material 2 whereby the lining material 2 is effectively impregnated with the binder 3 to enhance bonding force and any moisture contained in the tubular lining material is concurrently removed to prevent any premature curing of the binder. In the subsequent treatment, it is preferable to keep under reduced pressure the interior space of the lining material 2 from the rear end thereof, i.e. from the central part of the reel 11.

Figure 4:
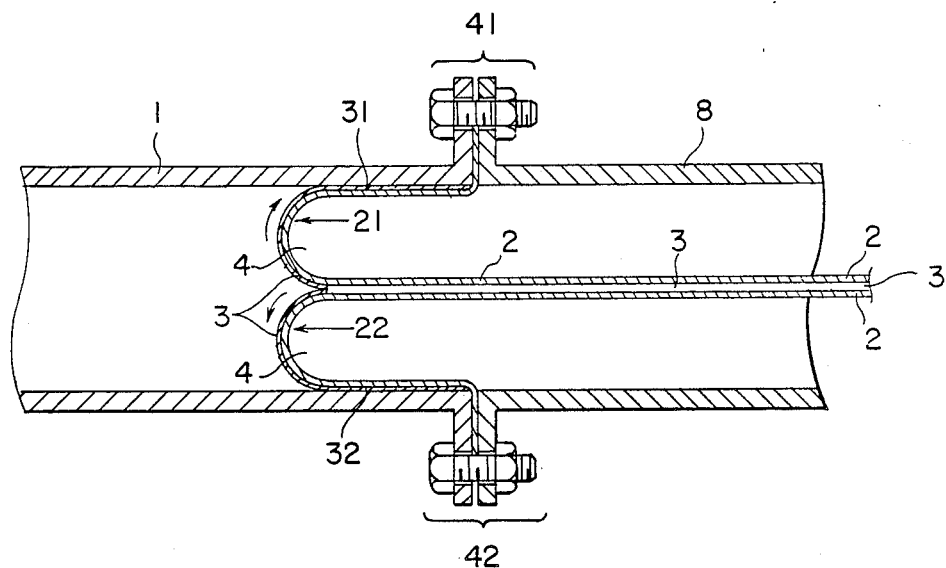
FIG. 4 is a longitudinal sectional view of a pipe line being bonded, fixing one end of a tubular lining material to one end of a pipe line of the method of the present invention.

After charging the interior space of the tubular lining material 2 with the binder 3 in an amount sufficient enough to be applied onto the inner surface thereof over its full length, a portion of the tubular lining material 2 enclosing the binder 3 is placed on a roller conveyer 12, and the lining material 2 is then closed at the front end thereof and passed through nip rollers 13 to squeeze the binder 3 and thereafter pushed forward by the aid of a caterpillar 14. The lining material 2 is allowed to ascend by the aid of a roller conveyer 15 and then introduced into a water column 8 from the top thereof. The lining material 2 is passed through the water column 8 and drawn out from the bottom thereof. The lining material is then fixed as shown in FIG. 4 at a connection part between the water column 8 and the undersea petroleum pipe line (pipe line 1).

Although the lining material 2 may be subjected to the evagination-lining method as shown in FIG. 3 while applying the binder 3 onto the inner surface of the lining material 2, the treatment may be carried out according to a method wherein the lining material 2 previously provided on the inner surface thereof with the binder 3 is wound on a reel 11 and the lining material 2 drawn out from the reel 11 is directly supplied to the water column 8.

In the case shown in FIG. 3, water is introduced to the water column 8 from the water inlet 9. The introduced water reaches the rear of the fixed portion whereby the water pressure in accordance with the water level in the water column 8 is applied to allow the lining material 2 in the fixed portion to move forward as shown by the arrow marks 21, 22 in FIG. 4 while being turned inside out, thus forming a turning portion 4. The water pressure may be produced by supplying water with a pump or the like instead of using head pressure of water from the water column 8.

By supplying further water to the water column 8, the lining material 2 is continuously evaginated in the turning portion 4 for evagination and allowed to move forwards within the undersea petroleum pipe line (pipe line 1) whereby the lining material 2 is correspondingly drawn out from the reel 11 and passed through the portion wherein the binder 3 is enclosed. The lining material thus provided on the inner surface thereof with the binder 3 is passed through the nip roller 13 to control the amount of the binder 3, passed through the water column 8 from the upper end to the lower end and turned inside out in the turning pint 4 for evagination (FIG. 4 referred to) whereby the lining material is pressed against the inner surface of the undersea petroleum pipe line (pipe line 1). The moving speed can be controlled by adjusting the water level of the water column 8.

The interior space of the undersea petroleum pipe line (pipe line 1) is filled with water in both the front and rear of the turning portion 4 of the lining material for evagination, and the water existing in front of the turning portion reaches the open end 5 (FIG. 3) of the undersea petroleum pipe line while the water existing in the rear of the turning portion communicates with the water in the water column 8. Thus, the difference in pressure between the water in the front of and the rear of the turning portion 4 can be freely controlled by adjusting the level of water in the water column 8, irrespective of the depth of sea at the turning portion 4.

The water existing in front of the turning portion 4 is pushed out according to the advance of the lining material 2 within the pipe line 1 and exhausted from the open end 5 of the pipe line. If necessary, the water may be positively exhausted from the open end by a pumping means or the like, for pressure adjustment.

As the turning portion 4 passes through the middle point of the pipe line 1, the lining material 2 is wholly drawn out from the reel 11 with the trading end also being passed through the water column 8 and introduced into the undersea petroleum pipe line. The evagination operation for the lining material 2 proceeds further, and when the lining material is evaginated over its full length, the open or trading end thereof will extend from the end 5 of the undersea petroleum pipe line 1, thus pipe line 1 being lined over its full length with the lining material 2.

As a reaction-curing type binder capable of reacting with water to initiate curing is used as the binder in the present invention, the curing of the binder initiates at the time the binder applied onto the inner surface of the lining material reaches the turning portion and is brought into contact with water fully charged into the pipe line. Thus, the curing of the binder does not occur prematurely and there is no necessity of considering the pot life. The binder is kept stable during the lining treatment of a pipe line as long as 1000 m or more and immediately interposed between the pipe line and the lining material as soon as the binder is brought into contact with water in the turning portion. Thus, it is possible to use a binder having a high curing speed to shorten the lining operation.

After introducing the tubular lining material into a pipe line under evagination, the inside of the tubular lining material is warmed in the conventional arts to accelerate the curing of the binder. However, it was extremely difficult to warm uniformly a long pipe line over its full length. In the method of this invention, on the other hand, a binder having a high curing speed can be used so that such warming is utterly unnecessary. It was also performed to cool a lining material having applied thereto a binder to prevent any premature curing. In the method of this invention, however, such treatment is unnecessary and a lining material having applied thereto a binder can be stored as such for a long period of time.

In cool and cold seasons, a binder is warmed to reduce the viscosity thereof to eliminate difficulty in application of the binder or evagination of a lining material due to increase of the viscosity of the binder. In the method of this invention, however, the binder can be warmed to reduce its viscosity without fear of any premature curing.

The method of this invention is very useful as a method for lining pipe lines of city gas, city water and sewage, petroleum and other various fields. The method of this invention is an excellent method which can be applied to lining of pipe lines, especially laid on the bottom of water.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A method for lining the inner surface of a pipe line laid in a body of water which comprises providing a pipe line to be lined in a body of water, providing a flexible tubular lining material to be evaginated into an interior space of said pipe line, pushing said flexible tubular lining material forward under a fluid pressure into said interior space of said pipe line evaginating said lining material and forming an evaginated inner surface, said tubular lining material being provided with a water-curable binder on said evaginated inner surface thereof, said binder having the property of being capable of reacting with water to initiate curing, advancing said flexible tubular lining material within said interior space of said pipe line continuously turning said lining material inside out under said fluid pressure creating a turning portion of said lining material as said lining material advances through said interior space of said pipe line, said pipe line in advance of said turning portion of said tubular lining material being continuously filled with water due to the immersion of said pipe line in said body of water, said binder reacting with said water within said pipe line to cure and bond said evaginated surface of said lining material onto said inner surface of said pipe line.

2. A method according to claim 1, wherein said water curable binder comprises a two-component curing binder comprising an epoxy resin and a ketiminated polyamine.

* * * * *